US009661586B2

(12) United States Patent
Gao et al.

(10) Patent No.: US 9,661,586 B2
(45) Date of Patent: May 23, 2017

(54) POWER CONTROL METHOD AND DEVICE FOR DEVICE TO DEVICE (D2D) TRANSMISSION

(71) Applicant: China Academy of Telecommunications Technology, Beijing (CN)

(72) Inventors: Qiubin Gao, Beijing (CN); Rui Zhao, Beijing (CN); Wenhong Chen, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/783,847

(22) PCT Filed: Mar. 18, 2014

(86) PCT No.: PCT/CN2014/073566
§ 371 (c)(1),
(2) Date: Oct. 10, 2015

(87) PCT Pub. No.: WO2014/166327
PCT Pub. Date: Oct. 16, 2014

(65) Prior Publication Data
US 2016/0057709 A1 Feb. 25, 2016

(30) Foreign Application Priority Data
Apr. 10, 2013 (CN) .......................... 2013 1 0123605

(51) Int. Cl.
*H04B 7/00* (2006.01)
*H04W 72/00* (2009.01)
(Continued)

(52) U.S. Cl.
CPC ......... *H04W 52/243* (2013.01); *H04W 52/04* (2013.01); *H04W 52/08* (2013.01);
(Continued)

(58) Field of Classification Search
None
See application file for complete search history.

(56) References Cited

U.S. PATENT DOCUMENTS

2012/0064935 A1* 3/2012 Hakola ................. H04W 72/02
455/513
2012/0294163 A1 11/2012 Turtinen et al.
(Continued)

FOREIGN PATENT DOCUMENTS

CN 102404837 A 4/2012
CN 102668686 A 9/2012
(Continued)

OTHER PUBLICATIONS

International Search Report of PCT/CN2014/073566.
(Continued)

*Primary Examiner* — Erika Washington
(74) *Attorney, Agent, or Firm* — Kilpatrick Townsend & Stockton LLP

(57) ABSTRACT

Disclosed are a power control method and device for D2D transmission. The method includes determining an upper limit value of interference power corresponding to a terminal. The upper limit value of the interference power is the maximum interference value which is allowed by a base station and generated by D2D transmission to cellular transmission. The base station sending the upper limit value of the interference power to the terminal the terminal determines the upper limit value of D2D transmission power by using the upper limit value of the interference power. The terminal determines the upper limit value of the D2D
(Continued)

transmission power, and determines the D2D transmission power, the D2D transmission power of the terminal device can be controlled, transmitting power of the D2D transmission is controlled to make the interference generated by same to the cellular transmission to a controlled range, and the interference of a D2D signal to a cellular signal is controlled.

14 Claims, 3 Drawing Sheets

(51) Int. Cl.
  *H04W 52/24*  (2009.01)
  *H04W 52/04*  (2009.01)
  *H04W 52/38*  (2009.01)
  *H04W 52/36*  (2009.01)
  *H04W 52/08*  (2009.01)
  *H04W 72/04*  (2009.01)

(52) U.S. Cl.
  CPC ....... *H04W 52/367* (2013.01); *H04W 52/383* (2013.01); *H04W 72/0473* (2013.01)

(56) References Cited

U.S. PATENT DOCUMENTS

2014/0198694 A1\* 7/2014 Yang ................... H04W 52/242
                        370/311
2014/0254401 A1\* 9/2014 Talwar ................. H04W 24/10
                        370/252

FOREIGN PATENT DOCUMENTS

| CN | 102823311 A | 12/2012 |
|---|---|---|
| CN | 103026676 A | 4/2013 |
| WO | 2013/139233 A1 | 9/2013 |

OTHER PUBLICATIONS

Fei Teng et al: "Power control based on interference pricing in hybrid D2D and cellular networks", 2012 IEEE Globecom Workshops (GC Wkshps 2012) : Anaheim, California, USA, Dec. 3-7, 2012, IEEE, Piscataway, NJ, Dec. 3, 2012 (Dec. 3, 2012), pp. 676-680, XP032341455, DOI: 10.1109/GLOCOMW.2012. 6477655; ISBN: 978-1-4673-4942-0.

The Extended European Search Report issued on Dec. 21, 2015 in the EP counterpart application (14782717.4).

\* cited by examiner

A UE receives an interference power upper limit from a BS, and determines a D2D transmission power upper limit from the interference power upper limit, where the interference power upper limit is the highest interference level, allowable by the BS, caused by D2D transmission to cellular transmission; and the D2D transmission power upper limit is the highest transmission power with interference to cellular transmission, which does not exceed the interference power upper limit ~301

The UE determines D2D transmission power from the D2D transmission power upper limit ~302

Fig.3

A UE receives an interference power upper limit corresponding to the UE from an BS, and determines a D2D transmission power upper limit from the interference power upper limit, where the interference power upper limit is the highest interference, allowable by the BS, caused by D2D transmission to cellular transmission; and the D2D transmission power upper limit is the highest transmission power with interference to cellular transmission, which does not exceed the interference power upper limit ~401

The UE determines D2D transmission power from the D2D transmission power upper limit ~402

The UE receives a closed-loop adjustment value controlled by a closed-loop power control command from by the BS, determines the D2D transmission power upper limit from the closed-loop adjustment value, and determines the D2D transmission power from the determined D2D transmission power upper limit ~403

Fig.4

POWER CONTROL METHOD AND DEVICE FOR DEVICE TO DEVICE (D2D) TRANSMISSION

This application is a US National Stage of International Application No. PCT/CN2014/073566, filed on 18 Mar. 2014, designating the United States, and claiming the benefit of Chinese Patent Application No. 201310123605.5, filed with the State Intellectual Property Office of People's Republic of China on Apr. 10, 2013 and entitled "Method and device for controlling power in Device to Device (D2D) transmission", which is hereby incorporated by reference in its entirety.

FIELD

The present invention relates to the field of communications and particularly to a method and device for controlling power in Device to Device (D2D) transmission.

BACKGROUND

In traditional cellular communication, voice, data and other traffic between two UEs should be exchanged through evolved NodeBs (eNBs) where they reside, and a core network. The Device to Device (D2D) technology refers to that data can be transmitted directly between adjacent UEs in a short-distance range over a direct link without being forwarded through a central node (i.e., an eNB).

Due to its short-distance communication characteristic and direct communication mode, the D2D technology has the following advantages: (1) a higher data rate, a lower delay, and a lower power consumption can be achieved by virtue of direct communication conducted between the UEs over a short distance; (2) a more efficient spectrum resources utilization can be achieved by virtue of UEs distributed widely in the network, and the short-distance link of the D2D communication; (3) a demand for sharing local data in services, e.g., wireless P2P, etc., can be satisfied, and a more flexible and more adaptive data service can be supplied by virtue of direct communication mode of D2D (4) a coverage area of network can be extended by virtue of D2D direct communication adopted by a large number of widely distributed UEs.

In Long Term Evolution (LTE) system, D2D communication refers to such a D2D communication process, controlled by the LTE system, operating in a LTE authorized frequency band. The D2D communication in LTE system can make full use of the advantages of the traditional D2D technology, and some problems in the traditional D2D technology, e.g., uncontrollable interference, etc., can be addressed by the control under LTE system.

If D2D communication is applied to the authorized frequency band of LTE system, then radio resources will be shared between the D2D communication and cellular communication, where the radio resources can be shared in an orthogonal mode or reusing mode. Here, the radio resources sharing in the orthogonal mode refers to that the radio resources are orthogonally divided in a static or dynamic manner to be accessed by cellular communication and D2D communication; and the radio resources sharing in the reusing mode refers to that the cellular resources being accessed are reused reasonably by D2D communication, while interference is limited to some level range.

If the same radio resources are accessed in the reusing mode by D2D communication and cellular communication, then interference between them may occur. Taking cellular uplink radio resources reused as an example, a first type of interference refers to interference caused by a D2D signal to a cellular signal, which may degrade the quality of cellular communication, and the strength of the first type interference is determined by power in D2D transmission, and the distance between a D2D transmitter and an eNB; and a second type of interference refers to interference caused by a cellular signal to a D2D signal, and the strength thereof is determined by the distance between a cellular transmitter and a D2D receiver, where cellular transmission at a short distance from the D2D receiver may impose strong interference to D2D communication.

SUMMARY

Embodiments of the invention provide a method and device for controlling power in D2D transmission, which control D2D transmit power of a UE so as to control interference of a D2D signal to a cellular signal.

In order to attain the object above, an embodiment of the invention provides a method for controlling power in Device to Device (D2D) transmission, the method including:

determining, by an base station (BS), an interference power upper limit for a UE, which is the highest interference level, allowable by the BS, of D2D transmission to cellular transmission; and sending, by the BS, the interference power upper limit to the UE so that the UE determines a D2D transmission power upper limit from the interference power upper limit.

An embodiment of the invention provides a method for controlling power in Device to Device (D2D) transmission, the method including:

receiving, by a UE, an interference power upper limit from an BS, wherein the interference power upper limit is the highest interference level, allowable by the BS, caused by D2D transmission to cellular transmission; and determining, by the UE, a D2D transmission power upper limit from the interference power upper limit, and determining D2D transmission power from the D2D transmission power upper limit.

An embodiment of the invention provides an BS including a processor; a memory; and a plurality of instruction modules stored in the memory, executable by the processor, wherein the plurality of instruction modules include:

a determining module configured to determine an interference power upper limit for a UE, which is the highest interference level, allowable by the BS, of Device to Device (D2D) transmission to cellular transmission; and a sending module configured to send the interference power upper limit to the UE so that the UE determines a D2D transmission power upper limit from the interference power upper limit.

An embodiment of the invention provides a UE including a processor; a memory; and a plurality of instruction modules stored in the memory, executable by the processor, wherein the plurality of instruction modules include a receiving module configured to receive an interference power upper limit from an BS, wherein the interference power upper limit is the highest interference level, allowable by the BS, caused by D2D transmission to cellular transmission;

a first determining module configured to determine a D2D transmission power upper limit from the interference power upper limit; and a second determining module configured to determine D2D transmission power from the D2D transmission power upper limit.

In the embodiments of the invention, the UE determines the D2D transmission power upper limit from the interference power upper limit (i.e., the highest interference level, allowable by the BS, caused by D2D transmission to cellular transmission), and determines the D2D transmission power from the D2D transmit power upper limit to thereby control the D2D transmission power of the UE, that is, to control the transmission power in D2D transmission so that the interference thereof to cellular transmission will lie in the controlled range, so as to control the interference of the D2D signal to the cellular signal. Furthermore the power control method in the embodiments of the invention can be performed separately from uplink power control of cellular transmission to thereby avoid the problem of a difficult tradeoff between the D2D interference control and cellular transmit power control parameters so as to effectively control the interference of D2D transmission to cellular transmission.

BRIEF DESCRIPTION OF THE DRAWINGS

In order to make the technical solutions of the invention more apparent, the drawings to which reference is made in the description of the embodiments will be described below briefly, and apparently the drawings in the description below merely illustrate some embodiments of the invention, but those ordinarily skilled in the art can further derive from these drawings other drawings without any inventive effort. In the drawings:

FIG. 3 illustrates a flow chart of a method for controlling power in D2D transmission, at the UE side according to an embodiment of the invention;

FIG. 4 illustrates a flow chart of a method for controlling power in D2D transmission, at the UE side according to another embodiment of the invention;

DETAILED DESCRIPTION OF THE EMBODIMENTS

The technical solutions in the invention will be described below clearly and fully with reference to the drawings in the invention, and apparently the embodiments to be described below are only a part but not all of the embodiments of the invention. All the other embodiments that can be derived by those ordinarily skilled in the art based upon the embodiments here of the invention without any inventive effort shall fall into the claimed scope of the invention.

Figure 1:
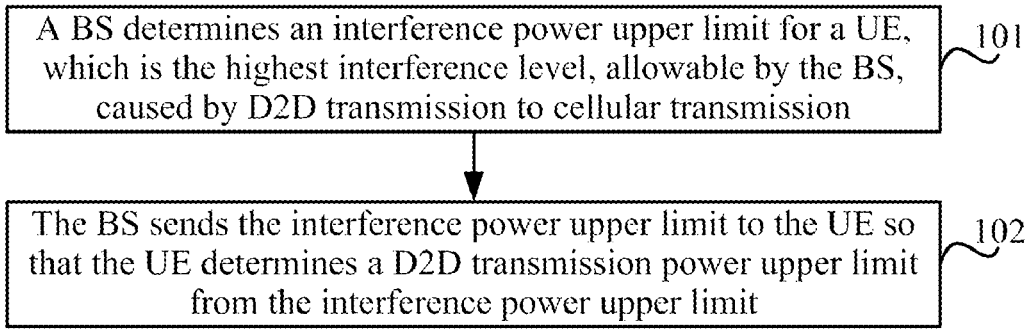
FIG. 1 illustrates a flow chart of a method for controlling power in D2D transmission, at the BS side according to an embodiment of the invention.

In view of the problem in the prior art, an embodiment of the invention provides a method for controlling power in D2D transmission, and as illustrated in FIG. 1, the method includes the following steps:

In the step 101, a BS determines an interference power upper limit for a UE (which is a D2D UE), which is the highest interference level (in dBm), allowable by the BS, caused by D2D transmission to cellular transmission (i.e., uplink cellular transmission).

In the embodiment of the invention, the BS can determine the interference power upper limit for the UE particularly as follows without any limitation thereto: the BS determines the interference power upper limit for the UE from measured overall uplink interference power and/or cellular signal transmission power. Particularly the BS determines that the interference power upper limit for the UE is an overall uplink interference power minus X [dB], where dB is the unit of X; or the BS determines that the interference power upper limit for the UE is a cellular transmission signal power minus Y [dB], where dB is the unit of Y, and the value of X and the value of Y can be real empirical values.

For example, if the BS measures the overall uplink interference power as $P_{Interf\_All}$ [dBm], then the BS can determine the interference power upper limit for the UE as $P_{Interf\_All}-X$ [dBm], where dBm is the unit of ($P_{Interf\_All}-X$).

In the embodiment of the invention, the interference power upper limit is an interference power upper limit over certain bandwidth, which can be an interference power upper limit over a unit bandwidth, e.g., an interference power upper limit over a bandwidth for a Physical Resource Block (PRB), or an interference power upper limit over a transmission bandwidth of D2D communication, or an interference power upper limit over a full bandwidth.

In the step 102, the BS sends the interference power upper limit to the UE (the D2D UE) so that the UE determines a D2D transmission power upper limit from the interference power upper limit.

Figure 2:
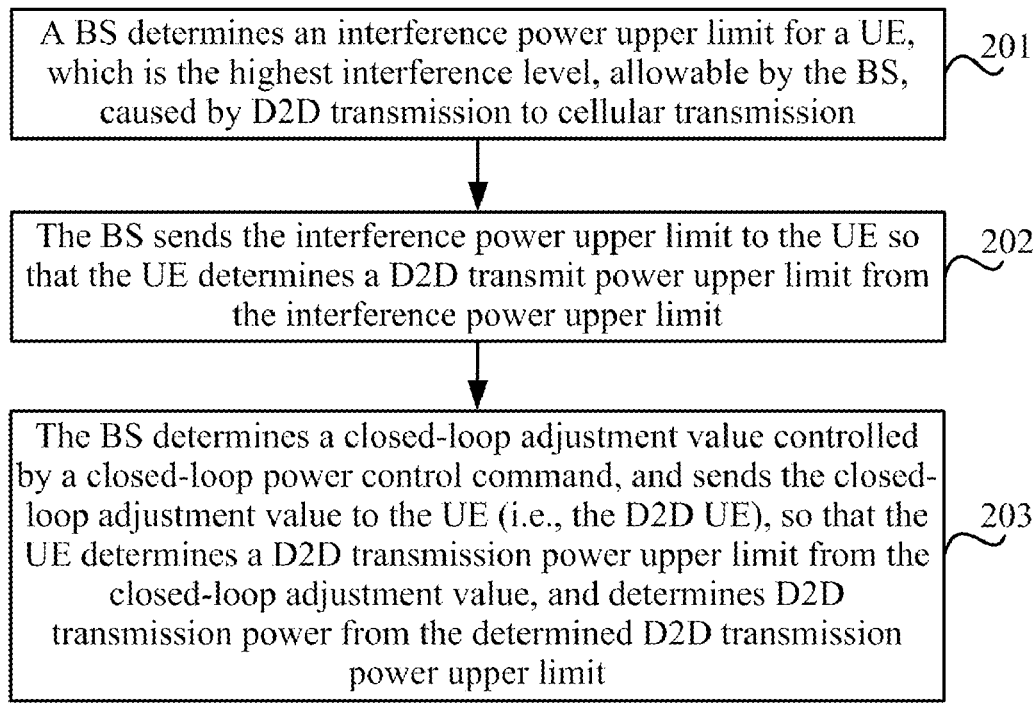
FIG. 2 illustrates a flow chart of a method for controlling power in D2D transmission, at the BS side according to another embodiment of the invention.

In the embodiment of the invention, the BS can further adjust the D2D transmission power upper limit of the UE by a closed-loop adjustment value controlled by a closed-loop power control command, and as illustrated in FIG. 2, the method includes:

In the step 201, a BS determines an interference power upper limit for a UE (which is a D2D UE), which is the highest interference level (in dBm), allowable by the BS, caused by D2D transmission to cellular transmission (i.e., uplink cellular transmission).

In the step 202, the BS sends the interference power upper limit to the UE (the D2D UE).

The steps 201 and 202 are the same as the steps 101 and 102, so a repeated description thereof will be omitted here.

In the step 203, the BS determines a closed-loop adjustment value controlled by a closed-loop power control command, and sends the closed-loop adjustment value to the UE (i.e., the D2D UE), so that the UE determines a D2D transmission power upper limit from the closed-loop adjustment value, and determines D2D transmission power from the determined D2D transmission power upper limit.

In the embodiment of the invention, the closed-loop adjustment value controlled by the closed-loop power control command is controlled separately from closed-loop power control of cellular uplink transmission, and the closed-loop adjustment value can be controlled in an absolute value manner or in an accumulation manner. Specifically, the absolute value manner refers to that the closed-loop power control command sent by the BS to the UE is mapped directly to the value of the closed-loop adjustment value, that is, $f_{Interf\_UL}(i)=\delta$, where $\delta$ is mapped by the closed-loop power control command, $f_{Interf\_UL}(i)$ is the closed-loop adjustment value in the i-th sub-frame; and the accumulation manner refers to that the closed-loop power control command sent by the BS to the UE is a modification value to a previous closed-loop adjustment value, that is, $f_{Interf\_UL}(i)=f_{Interf\_UL}(i-1)+\delta$, where $\delta$ is mapped by the closed-loop power control command.

Hereupon, in the process above, the BS can set the closed-loop power control command according to an interference condition caused by D2D transmission to cellular transmission. For example, the BS may measure an increase in interference power caused by the D2D UE to a cellular BS due to an instantaneous change in channel gain, so the BS can lower the D2D transmission power upper limit by setting the closed-loop power control command; and particularly the BS can let δ be a negative value, e.g., δ=−1 [dB], to lower the D2D transmission power upper limit. Moreover the D2D UE calculates the transmission power from a path loss which is such an estimated downlink path loss from the BS to the UE, and the estimated downlink path loss may be different from a real uplink path loss, so an influence introduced by the difference can be made up by setting the closed-loop power control command.

In summary, in the embodiments of the invention, the UE determines the D2D transmission power upper limit from the interference power upper limit (i.e., the highest interference, allowable by the BS, caused by D2D transmission to cellular transmission), and determines the D2D transmission power from the D2D transmission power upper limit to thereby control the D2D transmission power of the UE, that is, to control the transmission power in D2D transmission so that the interference thereof to cellular transmission will lie in the controlled range, so as to control the interference caused by the D2D signal to the cellular signal. Furthermore the power control method in the embodiments of the invention can be performed separately from uplink power control of cellular transmission to thereby avoid the problem of a difficult tradeoff between the D2D interference control and cellular transmission power control parameters so as to effectively control the interference caused by D2D transmission to cellular transmission.

FIG. 3 illustrates a method for controlling power in D2D transmission according to an embodiment of the invention, applicable to the UE side, where the method includes the following steps:

In the step 301, a UE receives an interference power upper limit from an BS, and determines a D2D transmission power upper limit from the interference power upper limit, where the interference power upper limit is the highest interference level (in dBm), allowable by the BS, caused by D2D transmission to cellular transmission; and the D2D transmission power upper limit is the highest transmission power with interference to cellular transmission, which does not exceed the interference power upper limit.

In the embodiment of the invention, the UE determines the D2D transmission power upper limit from the interference power upper limit particularly as follows: the UE determines the D2D transmission power upper limit from the interference power upper limit, and a path loss from the UE to the BS.

Furthermore the UE calculates the D2D transmission power upper limit in the equation of:

$$P_{LM,D2D}(i)=A+P_{O\_Interf\_UL}+\alpha \cdot PL;$$

Where $P_{LM,D2D}(i)$ represents a D2D transmission power upper limit in the i-th sub-frame; $P_{O\_Interf\_UL}$ represents the interference power upper limit (i.e., the interference power upper limit received by the UE from the BS) in [dBm]; PL represents the path loss from the UE to the BS; and α represents a compensation factor, 0≤α≤1, and α=1 represents complete compensation for the path loss, where the value of α is notified from the BS to the UE, or the value of α is a fixed value prescribed by both the BS and the UE, e.g., a prescribed fixed of α=1.

In the embodiment of the invention, in the equation above, A=0 or A=10 log$_{10}$ (M$_{D2D}$(i)), and if A=0, then a transmission power upper limit of D2D transmission over a unit bandwidth will be calculated accordingly, and if A=10 log$_{10}$(M$_{D2D}$(i)), then the transmission power upper limit of D2D transmission will be calculated accordingly, which will be described below in details.

If A=log$_{10}$(M$_{D2D}$(i)) then $P_{LM,D2D}(i)$ represents a transmission power upper limit over a D2D transmission bandwidth in the i-th sub-frame; $P_{O\_Interf\_UL}$ represents an interference power upper limit over a bandwidth of an elementary unit bandwidth (i.e., the interference power upper limit received by the UE from the BS) in [dBm]; and M$_{D2D}$(i) represents a bandwidth of D2D transmission in the i-th sub-frame, that is, M$_{D2D}$(i) represents the D2D transmission bandwidth for which the elementary unit bandwidth is certain bandwidth, for example, if the elementary unit bandwidth is a bandwidth of a Physical Resource Block (PRB), then M$_{D2D}$(i) represents the number of elementary unit bandwidths included in the D2D transmission bandwidth.

If A=0, then $P_{LM,D2D}(i)$ represents a transmission power upper limit over a D2D transmission bandwidth in the i-th sub-frame; and $P_{O\_Interf\_UL}$ represents an interference power upper limit over a D2D transmission bandwidth (i.e., the interference power upper limit received by the UE from the BS) in [dBm]; or if A=0, then $P_{LM,D2D}(i)$ represents a D2D transmission power upper limit over an elementary unit bandwidth in the i-th sub-frame; and $P_{O\_Interf\_UL}$ represents an interference power upper limit over a bandwidth of an elementary unit bandwidth (i.e., the interference power upper limit received by the UE from the BS) in [dBm].

In the step 302, the UE determines D2D transmission power from the D2D transmission power upper limit.

In the embodiment of the invention, the UE determines the D2D transmission power from the determined D2D transmission power upper limit particularly as follows: the UE determines the D2D transmission power no more than the D2D transmission power upper limit.

Furthermore the UE calculates the D2D transmission power in the equation of:

$$P_{D2D}(i)=\min\{P_{CMAX,D2D}(i),P_{LM,D2D}(i),P_{NC,D2D}(i)\}$$
[dBm]; or $$P_{D2D}(i)=\min\{P_{CMAX,D2D}(i),A+P_{O\_Interf\_UL}+\alpha \cdot PL, P_{NC,D2D}(i)\} \text{ [dBm]};$$

Where $P_{CMAX,D2D}$ represents the highest allowable transmission power of the UE for D2D transmission in the i-th sub-frame, and $P_{NC,D2D}(i)$ represents D2D transmission power in the i-th sub-frame, calculated without any restraint on the D2D transmission power.

Furthermore $P_{LM,D2D}(i)$ represents the D2D transmission power upper limit in the i-th sub-frame; $P_{O\_Interf\_UL}$ represents the interference power upper limit (i.e., the interference power upper limit received by the UE from the BS); α represents the compensation factor, 0≤α≤1, and α=1 represents complete compensation for the path loss, where the value of α is notified from the BS to the UE, or the value of α is a fixed value prescribed by both the BS and the UE, e.g., a prescribed fixed of α=1; and PL represents the path loss from the UE to the BS. Moreover A=0 or A=10 log$_{10}$(M$_{D2D}$(i)) and M$_{D2D}$(i) represents the bandwidth in PRBs of D2D transmission in the i-th sub-frame.

Furthermore if the UE does not conduct cellular transmission in a sub-frame of D2D transmission, then the UE determines $P_{CMAX,D2D}(i)=P_{CMAX}(i)$, where $P_{CMAX}(i)$ represents the highest transmission power of the UE in the i-th sub-frame; and If the UE conducts cellular transmission in a sub-frame of D2D transmission, then the UE determines $P_{CMAX,D2D}(i)=10 \log_{10}\{\hat{P}_{CMAX,D2D}(i)\}$ and $\hat{P}_{CMAX,D2D}(i)=\hat{P}_{CMAX}(i)-\hat{P}_{UL}(i)$, where $P_{CMAX}(i)=10 \log_{10}\{\hat{P}_{CMAX}(i)\}$, and $P_{UL}(i)=10 \log_{10}\{\hat{P}_{UL}(i)\}$, where $\hat{P}_{CMAX}(i)$ represents a linear value of the highest transmission power of the UE in the i-th sub-frame, $\hat{P}_{UL}(i)$ represents a linear value of transmission power of uplink cellular transmission in the i-th sub-frame, and $\hat{P}_{UL}(i)$ can include transmission power of a Physical Uplink Control Channel (PUCCH) and a Physical Uplink Shared Channel (PUSCH). In the embodiment of the invention, $\hat{P}_{CMAX}(i)$ and $P_{CMAX}(i)$ represent different representations of the same variable (i.e., the highest transmission power of the UE in the i-th sub-frame), where respectively $P_{CMAX}(i)$ represents a value in dB, and $\hat{P}_{CMAX}(i)$ represents a linear value. Alike, $\hat{P}_{UL}(i)$ and $P_{UL}(i)$ represent respectively a linear value and a value in dB of transmission power of uplink cellular transmission in the i-th sub-frame. $\hat{P}_{CMAX,D2D}(i)$ and $P_{CMAX,D2D}(i)$ represent respectively a linear value and a value in dB of the highest transmission power of the UE for D2D transmission in the i-th sub-frame.

Furthermore the UE can further determine $P_{NC,D2D}(i)$ in the equation of:

$$P_{NC,D2D}(i)=10 \log_{10}(M_{D2D}(i))+P_{O\_D2D}+\alpha_{D2D}\cdot PL_{D2D}+\Delta_{TF,D2D}(i)+f_{D2D}(i);$$

Where $P_{O\_D2D}$ represents target receiving power of D2D transmission; $\alpha_{D2D}$ represents a compensation factor, and $0\leq\alpha_{D2D}\leq 1$; $PL_{D2D}$ represents a path loss between one UE and another UE (i.e., two UEs); $\Delta_{TF,D2D}(i)$ represents a parameter determined by a modulation order of D2D transmission in the i-th sub-frame; and $f_{D2D}(i)$ represents a closed-loop adjustment value in the i-th sub-frame, controlled by a D2D transmission closed-loop power control command.

In the embodiment of the invention, the UE can further adjust the D2D transmission power upper limit by the closed-loop adjustment value controlled by the D2D transmission closed-loop power control command sent by the BS, and as illustrated in FIG. 4, the method includes:

In the step 401, a UE receives an interference power upper limit corresponding to the UE from an BS, and determines a D2D transmission power upper limit from the interference power upper limit, where the interference power upper limit is the highest interference, allowable by the BS, caused by D2D transmission to cellular transmission; and the D2D transmission power upper limit is the highest transmission power with interference to cellular transmission, which does not exceed the interference power upper limit.

In the step 402, the UE determines D2D transmission power from the D2D transmission power upper limit.

The steps 401 and 402 are the same as the steps 301 and 302, so a repeated description thereof will be omitted here.

In the step 403, the UE receives a closed-loop adjustment value controlled by a closed-loop power control command from the BS, determines the D2D transmission power upper limit from the closed-loop adjustment value, and determines the D2D transmission power from the determined D2D transmission power upper limit.

In the embodiment of the invention, the UE determines the D2D transmission power upper limit from the closed-loop adjustment value particularly as follows: the UE determines the D2D transmission power upper limit from the interference power upper limit, the closed-loop adjustment value, and a path loss from the UE to the BS. Furthermore the UE calculates the D2D transmission power upper limit in the equation of:

$$P_{LM,D2D}(i)=A+P_{O\_Interf\_UL}+\alpha\cdot PL+f_{Interf\_UL}(i);$$

Where $P_{LM,D2D}(i)$ represents a D2D transmission power upper limit in the i-th sub-frame; $P_{O\_Interf\_UL}$ represents the interference power upper limit (i.e., the interference power upper limit received by the UE from the BS) in [dBm]; PL represents the path loss from the UE to the BS; $\alpha$ represents a compensation factor, $0\leq\alpha\leq 1$, and $\alpha=1$ represents complete compensation for the path loss, where the value of $\alpha$ is notified from the BS to the UE, or the value of $\alpha$ is a fixed value prescribed by both the BS and the UE, e.g., a prescribed fixed of $\alpha=1$; and $f_{Interf\_UL}(i)$ represents the closed-loop adjustment value in the i-th sub-frame, controlled by the closed-loop power control command sent by the BS to the UE.

In the embodiment of the invention, in the equation above, $A=0$ or $A=10 \log_{10}(M_{D2D}(i))$, and if $A=0$, then a transmission power upper limit of D2D transmission over a unit bandwidth will be calculated accordingly, and if $A=10 \log_{10}(M_{D2D}(i))$, then the transmission power upper limit of D2D transmission will be calculated accordingly, which will be described below in details.

If $A=10 \log_{10}(M_{D2D}(i))$, then $P_{LM,D2D}(i)$ represents a transmission power upper limit over a D2D transmission bandwidth in the i-th sub-frame; $P_{O\_Interf\_UL}$ represents an interference power upper limit over a bandwidth of an elementary unit bandwidth (i.e., the interference power upper limit received by the UE from the BS) in [dBm]; and $M_{D2D}(i)$ represents a bandwidth of D2D transmission in the i-th sub-frame, that is, $M_{D2D}(i)$ represents the D2D transmission bandwidth for which the elementary unit bandwidth is certain bandwidth, for example, if the elementary unit bandwidth is a bandwidth of a PRB, then $M_{D2D}(i)$ represents the number of elementary unit bandwidths included in the D2D transmission bandwidth.

If $A=0$, then $P_{LM,D2D}(i)$ represents a transmission power upper limit over a D2D transmission bandwidth in the i-th sub-frame; and $P_{O\_Interf\_UL}$ represents an interference power upper limit over a D2D transmission bandwidth (i.e., the interference power upper limit received by the UE from the BS) in [dBm]; or if $A=0$, then $P_{LM,D2D}(i)$ represents a D2D transmission power upper limit over an elementary unit bandwidth in the i-th sub-frame; and $P_{O\_Interf\_UL}$ represents an interference power upper limit over a bandwidth of an elementary unit bandwidth (i.e., the interference power upper limit received by the UE from the BS) in [dBm].

In the embodiment of the invention, the UE determines the D2D transmission power from the determined D2D transmission power upper limit particularly as follows: the UE determines the D2D transmission power no more than the D2D transmission power upper limit.

Furthermore the UE calculates the D2D transmission power in the equation of:

$$P_{D2D}(i)=\min\{P_{CMAX,D2D}(i),P_{LM,D2D}(i),P_{NC,D2D}(i)\} \text{ [dBm]; or}$$

$$P_{D2D}(i)=\min\{P_{CMAX,D2D}(i),A+P_{O\_Interf\_UL}+\alpha\cdot PL, P_{NC,D2D}(i)\} \text{ [dBm];}$$

Where $P_{CMAX,D2D}(i)$ represents the highest transmission power of the UE for D2D transmission in the i-th sub-frame, and $P_{NC,D2D}(i)$ represents D2D transmission power in the i-th sub-frame, calculated without any restraint on the D2D transmission power.

Furthermore $P_{LM,D2D}(i)$ represents the D2D transmission power upper limit in the i-th sub-frame; $P_{O\_Interf\_UL}$ represents the interference power upper limit (i.e., the interference power upper limit received by the UE from the BS); $\alpha$ represents the compensation factor, $0 \leq \alpha \leq 1$, and $\alpha=1$ represents complete compensation for the path loss, where the value of $\alpha$ is notified from the BS to the UE, or the value of $\alpha$ is a fixed value prescribed by both the BS and the UE, e.g., a prescribed fixed of $\alpha=1$; and PL represents the path loss from the UE to the BS. Moreover $A=0$ or $A=10 \log_{10}(M_{D2D}(i))$, and $M_{D2D}(i)$ represents the bandwidth in PRBs of D2D transmission in the i-th sub-frame. Moreover $f_{Interf\_UL}(i)$ represents the closed-loop adjustment value in the i-th sub-frame, controlled by the closed-loop power control command sent by the BS to the UE.

Furthermore if the UE does not conduct cellular transmission in a sub-frame of D2D transmission, then the UE determines $P_{CMAX,D2D}(i)=P_{CMAX}(i)$ where $P_{CMAX}(i)$ represents the highest transmission power of the UE in the i-th sub-frame; and if the UE conducts cellular transmission in a sub-frame of D2D transmission, then the UE determines $\hat{P}_{CMAX,D2D}(i)=10 \log_{10}\{\hat{P}_{CMAX,D2D}(i)\}$ and $\hat{P}_{CMAX,D2D}(i)=\hat{P}_{CMAX}(i)-\hat{P}_{UL}(i)$, where $P_{CMAX}(i)=10 \log_{10}\{\hat{P}_{CMAX}(i)\}$, and $P_{UL}(i)=10 \log_{10}\{\hat{P}_{UL}(i)\}$, where $\hat{P}_{CMAX}(i)$ represents a linear value of the highest transmission power of the UE in the i-th sub-frame, $\hat{P}_{UL}(i)$ represents a linear value of transmission power of uplink cellular transmission in the i-th sub-frame, and $\hat{P}_{UL}(i)$ can include transmission power of a PUCCH and a PUSCH.

Furthermore the UE can further determine $P_{NC,D2D}(i)$ in the equation of:

$$P_{NC,D2D}(i)=10 \log_{10}(M_{D2D}(i))+P_{O\_D2D}+\alpha_{D2D} \cdot PL_{D2D}+\Delta_{TF,D2D}(i)+f_{D2D}(i);$$

Where $P_{O\_D2D}$ represents target receiving power of D2D transmission; $\alpha_{D2D}$ represents a compensation factor, and $0 \leq \alpha_{D2D} \leq 1$; $PL_{D2D}$ represents a path loss between one UE and another UE (i.e., two UEs); $\Delta_{TF,D2D}(i)$ represents a parameter determined by a modulation order of D2D transmission in the i-th sub-frame; and $f_{D2D}(i)$ represents the closed-loop adjustment value in the i-th sub-frame, controlled by the D2D transmission closed-loop power command.

In the embodiment of the invention, the closed-loop adjustment value controlled by the closed-loop power control command is controlled separately from closed-loop power control of cellular uplink transmission, and the closed-loop adjustment value can be controlled in an absolute value manner or in an accumulation manner. Specifically, the absolute value manner refers to that the closed-loop power control command sent by the BS to the UE is mapped directly to the value of the closed-loop adjustment value, that is, $f_{Interf\_UL}(i)=\delta$, where $\delta$ is mapped by the closed-loop power control command; and the accumulation manner refers to that the closed-loop power control command sent by the BS to the UE is a modification value to a previous closed-loop adjustment value, that is, $f_{Interf\_UL}(i)=f_{Interf\_UL}(i-1)+\delta$, where $\delta$ is mapped by the closed-loop power control command.

Hereupon, in the process above, the BS can set the closed-loop power control command according to an interference condition caused by D2D transmission to cellular transmission. For example, the BS may measure an increase in interference power caused by the D2D UE to a cellular BS due to an instantaneous change in channel gain, so the BS can lower the D2D transmission power upper limit by setting the closed-loop power control command; and particularly the BS can let $\delta$ be a negative value, e.g., $\delta=-1$ [dB], to lower the D2D transmission power upper limit. Moreover the D2D UE calculates the transmission power from a path loss which is such an estimated downlink path loss from the BS to the UE, and the estimated downlink path loss may be different from a real uplink path loss, so an influence introduced by the difference can be made up by setting the closed-loop power control command.

In summary, in the embodiments of the invention, the UE determines the D2D transmission power upper limit from the interference power upper limit (i.e., the highest interference, allowable by the BS, caused by D2D transmission to cellular transmission), and determines the D2D transmission power from the D2D transmission power upper limit to thereby control the D2D transmission power of the UE, that is, to control the transmission power in D2D transmission so that the interference thereof to cellular transmission will lie in the controlled range, so as to control the interference caused by the D2D signal to the cellular signal. Furthermore the power control method in the embodiments of the invention can be performed separately from uplink power control of cellular transmission to thereby avoid the problem of a difficult tradeoff between the D2D interference control and cellular transmission power control parameters so as to effectively control the interference caused by D2D transmission to cellular transmission.

Figure 5:
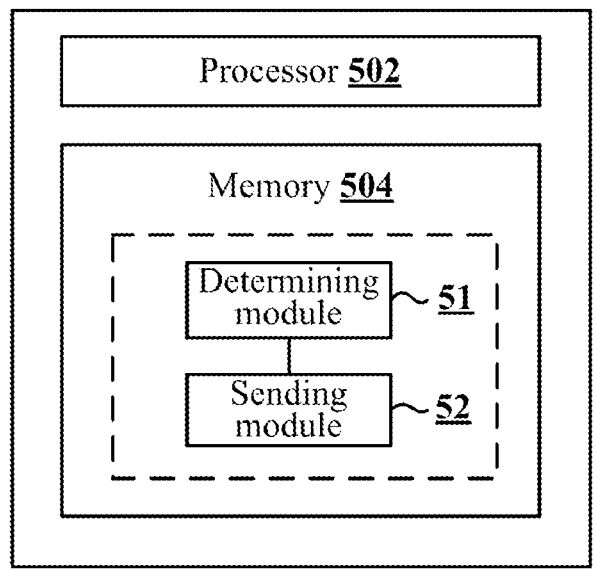
FIG. 5 illustrates a schematic structural diagram of an BS according to an embodiment of the invention.

Based upon the same inventive idea as the method above, an embodiment of the invention further provides an BS equipment as illustrated in FIG. 5, which includes:

A processor 502;

A memory 504; and

A plurality of instruction modules stored in the memory 504, executable by the processor 502, where the plurality of instruction modules includes:

A determining module 51 is configured to determine an interference power upper limit for a UE, which is the highest interference level, allowable by the BS, caused by D2D transmission to cellular transmission; and A sending module 52 is configured to send the interference power upper limit to the UE so that the UE determines a D2D transmission power upper limit from the interference power upper limit.

The determining module 51 is configured to determine the interference power upper limit for the UE from overall uplink interference power and/or cellular signal transmission power.

The determining module 51 is further configured to determine that the interference power upper limit for the UE is an overall uplink interference power minus X [dB]; or to determine that the interference power upper limit for the UE is a cellular signal transmission power minus Y [dB].

The determining module 51 is further configured to determine a closed-loop adjustment value controlled by a closed-loop power control command; and The sending module 52 is further configured to send the closed-loop adjustment value controlled by the closed-loop power control command to the UE.

In the embodiment of the invention, the closed-loop adjustment value controlled by the closed-loop power control command is controlled in an absolute value manner or in an accumulation manner. Specifically, the absolute value manner refers to that the closed-loop power control command sent by the BS to the UE is mapped directly to the value of the closed-loop adjustment value; and the accumulation manner refers to that the closed-loop power control command sent by the BS to the UE is a modification value to a previous closed-loop adjustment value.

Here the respective modules of the device according to the embodiment of the invention can be integrated together or can be deployed separately. The respective modules above can be combined into a single module or can be subdivided into a plurality of sub-modules.

Figure 6:
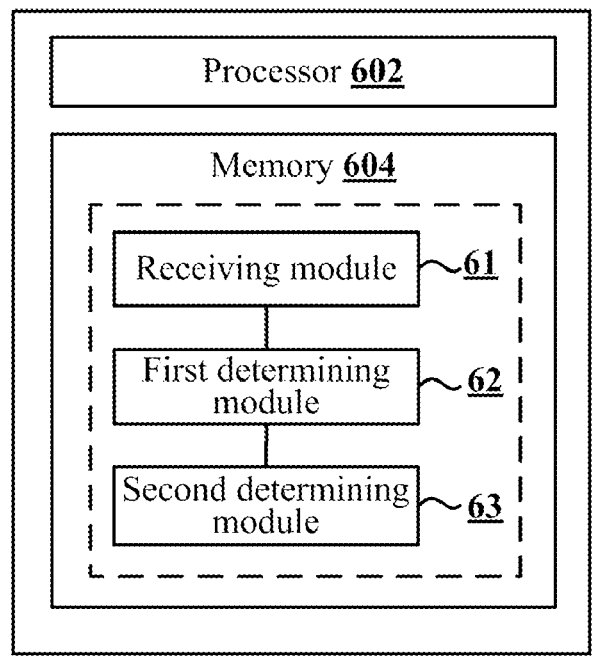
FIG. 6 illustrates a schematic structural diagram of a UE according to an embodiment of the invention.

Based upon the same inventive idea as the method above, an embodiment of the invention further provides a UE equipment as illustrated in FIG. 6, which includes:

A processor 602;

A memory 604; and

A plurality of instruction modules stored in the memory 604, executable by the processor 602, where the plurality of instruction modules includes:

A receiving module 61 is configured to receive an interference power upper limit from an BS, where the interference power upper limit is the highest interference, allowable by the BS, caused by D2D transmission to cellular transmission; a first determining module 62 is configured to determine a D2D transmission power upper limit from the interference power upper limit; and a second determining module 63 is configured to determine D2D transmission power from the D2D transmission power upper limit.

The first determining module 62 is configured to determine the D2D transmission power upper limit from the interference power upper limit, and a path loss from the UE to the BS.

The first determining module 62 is configured to calculate the D2D transmission power upper limit in the equation of:

$$P_{LM,D2D}(i)=A+P_{O\_Interf\_UL}+\alpha \cdot PL;$$

Where $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; and $A=0$ or $A=\log_{10}(M_{D2D}(i))$, where $M_{D2D}(i)$ represents a bandwidth of D2D transmission in the i-th sub-frame.

The second determining module 63 is configured to determine the D2D transmission power no more than the D2D transmission power upper limit.

The second determining module 63 is configured to determine the D2D transmission power in the equation of:

$$P_{D2D}=\min\{P_{CMAX,D2D}(i), P_{LM,D2D}(i), P_{NC,D2D}(i)\} \text{ [dBm]; or}$$

$$P_{D2D}=\min\{P_{CMAX,D2D}(i), A+P_{O\_Interf\_UL}+\alpha \cdot PL, P_{NC,D2D}(i)\} \text{ [dBm]};$$

Where $P_{CMAX,D2D}(i)$ represents the highest transmission power of the UE for D2D transmission in the i-th sub-frame, and $P_{NC,D2D}(i)$ represents D2D transmission power in the i-th sub-frame, calculated without any restraint on the D2D transmission power; and $P_{LM,D2D}(i)=A+P_{O\_Interf\_UL}+\alpha \cdot PL$, where $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; and $A=0$ or $A=10 \log_{10}(M_{D2D}(i))$, where $M_{D2D}(i)$ represents a bandwidth of D2D transmission in the i-th sub-frame.

The receiving module 61 is further configured to receive a closed-loop adjustment value controlled by a closed-loop power control command from the BS; the first determining module 62 is further configured to determine the D2D transmission power upper limit from the closed-loop adjustment value; and the second determining module 63 is further configured to determine the D2D transmission power from the determined D2D transmission power upper limit.

The first determining module 62 is configured to determine the D2D transmission power upper limit from the interference power upper limit, the closed-loop adjustment value controlled by the closed-loop power control command, and a path loss from the UE to the BS.

The first determining module 62 is configured to calculate the D2D transmission power upper limit in the equation of:

$$P_{LM,D2D}(i)=A+P_{O\_Interf\_UL}+\alpha \cdot PL+f_{Interf\_UL}(i);$$

Where $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; $f_{Interf\_UL}(i)$ represents the closed-loop adjustment value in the i-th sub-frame, controlled by the closed-loop power control command sent by the BS to the UE; and $A=0$ or $A=10 \log_{10}(M_{D2D}(i))$, where $M_{D2D}(i)$ represents a bandwidth of D2D transmission in the i-th sub-frame.

The second determining module 63 is configured to determine the D2D transmission power no more than the D2D transmission power upper limit.

The second determining module 63 is configured to determine the D2D transmission power in the equation of:

$$P_{D2D}(i)=\min\{P_{CMAX,D2D}(i), P_{LM,D2D}(i), P_{NC,D2D}(i)\} \text{ [dBm]; or}$$

$$P_{D2D}(i)=\min\{P_{CMAX,D2D}(i), A+P_{O\_Interf\_UL}+\alpha \cdot PL, P_{NC,D2D}(i)\} \text{ [dBm]};$$

Where $P_{CMAX,D2D}(i)$ represents the highest allowable transmission power of the UE for D2D transmission in the i-th sub-frame, and $P_{NC,D2D}(i)$ represents D2D transmission power in the i-th sub-frame, calculated without any restraint on the D2D transmission power; and $P_{LM,D2D}(i)=A+P_{O\_Interf\_UL}+\alpha \cdot PL+f_{Interf\_UL}(i)$, where $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; $f_{Interf\_UL}(i)$ represents the closed-loop adjustment value in the i-th sub-frame, controlled by the closed-loop power control command sent by the BS to the UE; and $A=0$ or $A=10 \log_{10}(M_{D2D}(i))$, where $M_{D2D}(i)$ represents a bandwidth of D2D transmission in the i-th sub-frame.

The second determining module 63 is further configured, if the UE does not conduct cellular transmission in a sub-frame of D2D transmission, to determine $P_{CMAX,D2D}(i)=P_{CMAX}(i)$, where $P_{CMAX}(i)$ represents the highest transmission power of the UE in the i-th sub-frame; and if the UE conducts cellular transmission in a sub-frame of D2D transmission, to determine $P_{CMAX,D2D}(i)=10 \log_{10}\{\hat{P}_{CMAX,D2D}(i)\}$ and $\hat{P}_{CMAX,D2D}(i)=\hat{P}_{CMAX}(i)-\hat{P}_{UL}(i)$, where $P_{CMAX}(i)=10 \log_{10}\{\hat{P}_{CMAX}(i)\}$, and $P_{UL}(i)=10 \log_{10}\{\hat{P}_{UL}(i)\}$, where $\hat{P}_{CMAX}(i)$ represents a linear value of the highest transmission power of the UE in the i-th sub-frame, and $\hat{P}_{UL}(i)$ represents a linear value of transmission power of uplink cellular transmission in the i-th sub-frame.

Furthermore the second determining module 63 is further configured to determine $P_{NC,D2D}(i)$ in the equation of:

$$P_{NC,D2D}(i)=10 \log_{10}(M_{D2D}(i))+P_{O\_D2D}+\alpha_{D2D} \cdot PL_{D2D}+\Delta_{TF,D2D}(i)+f_{D2D}(i);$$

Where $P_{O\_D2D}$ represents target receiving power of D2D transmission; $\alpha_{D2D}$ represents a compensation factor, and $0 \leq \alpha_{D2D} \leq 1$; $PL_{D2D}$ represents a path loss between one UE and another UE; $\Delta_{TF,D2D}(i)$ represents a parameter determined by a modulation order of D2D transmission in the i-th sub-frame; and $f_{D2D}$ represents the closed-loop adjustment value in the i-th sub-frame, controlled by the D2D transmission closed-loop power command.

In the embodiment of the invention, the closed-loop adjustment value controlled by the closed-loop power control command is controlled in an absolute value manner or in an accumulation manner. Specifically, the absolute value manner refers to that the closed-loop power control command sent by the BS to the UE is mapped directly to the value of the closed-loop adjustment value; and the accumulation manner refers to that the closed-loop power control command sent by the eNB to the UE is a modification value to a previous closed-loop adjustment value.

In the embodiment of the invention, the D2D transmission power upper limit is the highest transmission power with interference to cellular transmission not exceeding the interference power upper limit.

Here the respective modules of the device according to the embodiment of the invention can be integrated together or can be deployed separately. The respective modules above can be combined into a single module or can be subdivided into a plurality of sub-modules.

Those ordinarily skilled in the art can clearly appreciate from the foregoing description of the embodiments that the invention can be implemented in software plus a necessary general hardware platform or, of course, in hardware, although the former implementation may be preferred in many cases. Based upon such understanding, the technical solutions of the invention in essence or the part thereof contributing to the prior art can be embodied in the form of a software product, which can be stored in a storage medium, and which includes several instructions to cause a terminal device (e.g., a mobile phone, a personal computer, a server, a network device, etc.) to perform the methods according to the respective embodiments of the invention.

Those ordinarily skilled in the art can appreciate that the drawings are merely schematic diagrams of some preferred embodiments, but the modules or the flows in the drawings may not necessarily be required to put the invention into practice.

Those ordinarily skilled in the art can appreciate that the modules in the devices according to the embodiments can be distributed in the devices according to the embodiments, as described in the embodiments, or can be arranged in one or more devices different from the embodiments while being adapted accordingly. The modules in the embodiments above can be combined into a single module or subdivided into a plurality of sub-modules.

The embodiments above of the invention have been numbered only for the sake of a convenient description without suggesting any superiority or inferiority of one embodiment to another embodiment.

The foregoing disclosure is merely illustrative of several particular embodiments of the invention, but the invention will not be limited thereto, and any variations which can occur to those skilled in the art shall fall into the claimed scope of the invention.

The invention claimed is:

1. A method for controlling power in Device to Device (D2D) transmission, the method comprising:
   determining, by an base station (BS), an interference power upper limit for a UE, which is the highest interference level, allowed by the BS, caused by D2D transmission to cellular transmission; and
   sending, by the BS, the interference power upper limit to the UE so that the UE determines a D2D transmission power upper limit from the interference power upper limit;
   wherein the D2D transmission power upper limit is determined by the UE in the equation of:

$$P_{LM,D2D}(i)=A+P_{O\_Interf\_UL}+\alpha\cdot PL;$$

wherein $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; and A=0 or A=10 $\log_{10}(M_{D2D}(i))$, where $M_{D2D}(i)$ represents a bandwidth of D2D transmission in the i-th sub-frame.

2. The method according to claim 1, wherein determining, by the BS, the interference power upper limit for the UE comprises:
   determining, by the BS, the interference power upper limit for the UE from overall uplink interference power and/or cellular signal transmission power.

3. The method according to claim 1, wherein the method further comprises:
   determining, by the BS, a closed-loop adjustment value controlled by a closed-loop power control command, and sending the closed-loop adjustment value controlled by the closed-loop power control command to the UE;
   wherein the closed-loop adjustment value controlled by the closed-loop power control command is controlled in an absolute value manner or in an accumulation manner;
   wherein the absolute value manner refers to that the closed-loop power control command sent by the BS to the UE is mapped directly to the value of the closed-loop adjustment value; and
   the accumulation manner refers to that the closed-loop power control command sent by the BS to the UE is a modification value to a previous closed-loop adjustment value.

4. A method for controlling power in Device to Device (D2D) transmission, the method comprising:
   receiving, by a UE, an interference power upper limit from an base station (BS), wherein the interference power upper limit is the highest interference level, allowed by the BS, caused by D2D transmission to cellular transmission; and
   determining, by the UE, a D2D transmission power upper limit from the interference power upper limit, and determining D2D transmission power from the D2D transmission power upper limit;
   wherein determining, by the UE, the D2D transmission power upper limit from the interference power upper limit comprises:
   calculating, by the UE, the D2D transmission power upper limit in the equation of:

$$P_{LM,D2D}(i)=A=P_{O\_Interf\_UL}=\alpha\cdot PL;$$

wherein $P_{LM,D2D}(i)$ represents a D2D transmission power upper limit in the i-th sub-frame; $P_{O\_interf\_UL}$ represents the interference power upper limit; $\alpha$ represents a compensation factor, and $0 \leq \alpha \leq 1$; PL represents the path loss from the UE to the BS; and A=0 or A=10 $\log_{10}(M_{D2D}(i))$, where $M_{D2D}(i)$ represents a bandwidth of D2D transmission in the i-th sub-frame.

5. The method according to claim 4, wherein the method further comprises:
   receiving, by the UE, a closed-loop adjustment value controlled by a closed-loop power control command from the BS; determining the D2D transmission power upper limit from the closed-loop adjustment value; and determining the D2D transmission power from the determined D2D transmission power upper limit;

wherein the closed-loop adjustment value controlled by the closed-loop power control command is controlled in an absolute value manner or in an accumulation manner;

wherein the absolute value manner refers to that the closed-loop power control command sent by the BS to the UE is mapped directly to the value of the closed-loop adjustment value; and the accumulation manner refers to that the closed-loop power control command sent by the BS to the UE is a modification value to a previous closed-loop adjustment value.

6. The method according to claim 5, wherein determining, by the UE, the D2D transmission power upper limit from the closed-loop adjustment amount comprises:

determining, by the UE, the D2D transmission power upper limit from the interference power upper limit, the closed-loop adjustment value, and a path loss from the UE to the BS.

7. The method according to claim 6, wherein determining, by the UE, the D2D transmission power upper limit from the interference power upper limit, the closed-loop adjustment value, and the path loss from the UE to the BS comprises:

calculating, by the UE, the D2D transmission power upper limit in the equation of:

$$P_{LM,D2D}(i)=A+P_{O\_Interf\_UL}+\alpha \cdot PL+f_{interf\_UL}(i);$$

wherein $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; $f_{interf\_UL}(i)$ represents the closed-loop adjustment value in the i-th sub-frame, controlled by the closed-loop power control command sent by the BS to the UE; and A=0 or A=10 $\log_{10}(M_{D2D}(i))$, wherein $M_{D2D}(i)$ represents a bandwidth of D2D transmission in the i-th sub-frame.

8. An base station (BS), comprising a processor; a memory; and a plurality of instruction modules stored in the memory, executable by the processor, wherein the plurality of instruction modules comprise:

a determining module configured to determine an interference power upper limit for a UE, which is the highest interference level, allowed by the BS, caused by Device to Device (D2D) transmission to cellular transmission; and a sending module configured to send the interference power upper limit to the UE so that the UE determines a D2D transmission power upper limit from the interference power upper limit;

wherein the D2D transmission power upper limit is determined by the UE in the equation of:

$$P_{LM,D2D}(i)=A+P_{O\_Interf\_UL}+\alpha \cdot PL;$$

wherein $P_{LM,D2D}(i)$ represents a D2D transmission power upper limit in the i-th sub-frame; $P_{O\_Interf\_UL}$ represents the interference power upper limit; $\alpha$ represents a compensation factor, and $0 \leq \alpha \leq 1$; PL represents the path loss from the UE to the BS; and A=0 or A=10 $\log_{10}(M_{D2D}(i))$, where $M_{D2D}(i)$ represents a bandwidth of D2D transmission in the i-th sub-frame.

9. The BS according to claim 8, wherein:

the determining module is configured to determine the interference power upper limit for the UE from overall uplink interference power and/or cellular signal transmission power.

10. The BS according to claim 8, wherein:

the determining module is further configured to determine a closed-loop adjustment value controlled by a closed-loop power control command; and the sending module is further configured to send the closed-loop adjustment value controlled by the closed-loop power control command to the UE;

wherein the closed-loop adjustment value controlled by the closed-loop power control command is controlled in an absolute value manner or in an accumulation manner;

wherein the absolute value manner refers to that the closed-loop power control command sent by the BS to the UE is mapped directly to the value of the closed-loop adjustment value; and the accumulation manner refers to that the closed-loop power control command sent by the BS to the UE is a modification value to a previous closed-loop adjustment value.

11. A UE, comprising a processor; a memory; and a plurality of instruction modules stored in the memory, executable by the processor, wherein the plurality of instruction modules comprise:

a receiving module configured to receive an interference power upper limit from an base station (BS), wherein the interference power upper limit is the highest interference level, allowed by the BS, caused by D2D transmission to cellular transmission;

a first determining module configured to determine a D2D transmission power upper limit from the interference power upper limit; and a second determining module configured to determine D2D transmission power from the D2D transmission power upper limit;

wherein the first determining module is configured to calculate the D2D transmission power upper limit in the equation of:

$$P_{LM,D2D}(i)=A+P_{O\_inteif\_UL}+\alpha \cdot PL;$$

wherein $P_{LM,D2D}(i)$ represents a D2D transmission power upper limit in the i-th sub-frame; $P_{O\_interf\_UL}$ represents the interference power upper limit $\alpha$ represents a compensation factor, and $0 \leq \alpha \leq 1$; PL represents the path loss from the UE to the BS; and A=0 or A=10 $\log_{10}(M_{D2D}(i))$, wherein $M_{D2D}(i)$ represents a bandwidth of D2D transmission in the i-th sub-frame.

12. The UE according to claim 11, wherein:

the receiving module is further configured to receive a closed-loop adjustment value controlled by a closed-loop power control command from the BS;

the first determining module is further configured to determine the D2D transmission power upper limit from the closed-loop adjustment value; and the second determining module is further configured to determine the D2D transmission power from the determined D2D transmission power upper limit;

wherein the closed-loop adjustment value controlled by the closed-loop power control command is controlled in an absolute value manner or in an accumulation manner;

wherein the absolute value manner refers to that the closed-loop power control command sent by the BS to the UE is mapped directly to the value of the closed-loop adjustment value; and the accumulation manner refers to that the closed-loop power control command sent by the BS to the UE is a modification value to a previous closed-loop adjustment value.

13. The UE according to claim 12, wherein:

the first determining module is configured to determine the D2D transmission power upper limit from the interference power upper limit, the closed-loop adjustment value, and a path loss from the UE to the BS.

14. The UE according to claim 13, wherein:

the first determining module is configured to calculate the D2D transmission power upper limit in the equation of:

$$P_{LM,D2D}(i)=A+P_{O\_interf\_UL}+\alpha \cdot PL + f_{interf\_UL}(i);$$

wherein $P_{LM,D2D}(i)$ represents a D2D transmission power upper limit in the i-th sub-frame; $P_{O\_interf\_UL}$ represents the interference power upper limit; $\alpha$ represents a compensation factor, and $0 \leq \alpha \leq 1$; PL represents the path loss from the UE to the BS; $f_{interf\_UL}(i)$ represents the closed-loop adjustment value in the i-th sub-frame, controlled by the closed-loop power control command sent by the BS to the UE; and A=0 or A=10 $\log_{10}(M_{D2D}(i))$, wherein $M_{D2D}(i)$ represents a bandwidth of D2D transmission in the i-th sub-frame.

* * * * *